US011588800B2

United States Patent
Xie et al.

(10) Patent No.: US 11,588,800 B2
(45) Date of Patent: Feb. 21, 2023

(54) CUSTOMIZABLE VOICE-BASED USER AUTHENTICATION IN A MULTI-TENANT SYSTEM

(71) Applicant: salesforce.com, inc., San Francisco, CA (US)

(72) Inventors: Tian Xie, Palo Alto, CA (US); Caiming Xiong, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 550 days.

(21) Appl. No.: 16/685,806

(22) Filed: Nov. 15, 2019

(65) Prior Publication Data

US 2021/0152534 A1 May 20, 2021

(51) Int. Cl.
| | |
|---|---|
| *G06F 15/16* | (2006.01) |
| *H04L 9/40* | (2022.01) |
| *G10L 15/22* | (2006.01) |
| *G10L 15/08* | (2006.01) |
| *H04L 51/02* | (2022.01) |
| *H04L 101/37* | (2022.01) |

(52) U.S. Cl.
CPC .............. *H04L 63/08* (2013.01); *G10L 15/08* (2013.01); *G10L 15/22* (2013.01); *H04L 51/02* (2013.01); *G10L 2015/088* (2013.01); *H04L 2101/37* (2022.05)

(58) Field of Classification Search
CPC .............................. H04L 63/08; H04L 51/02
See application file for complete search history.

(56) References Cited

U.S. PATENT DOCUMENTS

| | | | | |
|---|---|---|---|---|
| 6,459,776 | B1* | 10/2002 | Aktas | H04M 3/5307 379/88.19 |
| 7,328,166 | B1* | 2/2008 | Geoghegan | G06Q 10/02 705/5 |
| 8,949,725 | B1* | 2/2015 | Goncharuk | G06Q 10/107 715/758 |
| 10,607,179 | B1* | 3/2020 | Lee | G06Q 10/0838 |
| 10,749,824 | B1* | 8/2020 | Robles | H04M 3/5116 |
| 2002/0168986 | A1* | 11/2002 | Lau | H04W 4/024 455/563 |
| 2004/0240639 | A1* | 12/2004 | Colson | H04M 3/4931 379/88.18 |
| 2006/0026097 | A1* | 2/2006 | Nethery | G06Q 20/40 705/40 |
| 2007/0127657 | A1* | 6/2007 | Shaffer | H04M 15/06 379/142.1 |

(Continued)

*Primary Examiner* — Hieu T Hoang
(74) *Attorney, Agent, or Firm* — Fenwick & West LLP

(57) ABSTRACT

A system authenticates users using voice-based conversations. The system allows the authentication process to be customized using an authentication plan. For example, the system may be a multi-tenant system that allows customization of the authentication process for each tenant. The authentication plan is represented as an expression of phrase types, each phrase type associated with a phrase verification method. The system authenticates a user by executing the expression of an authentication plan for that user in response to a request from the user. The system performs a conversation with the user according to the authentication plan. The system determines whether to allow or deny the user request based on the result of evaluation of the expression of the authentication plan.

18 Claims, 9 Drawing Sheets

(56) References Cited

U.S. PATENT DOCUMENTS

| | | | | |
|---|---|---|---|---|
| 2007/0265881 | A1* | 11/2007 | El Eman | G16H 10/20 705/3 |
| 2009/0013255 | A1* | 1/2009 | Yuschik | G06F 3/048 715/728 |
| 2009/0037982 | A1* | 2/2009 | Wentker | H04L 63/08 726/3 |
| 2009/0089070 | A1* | 4/2009 | Engel | H04L 67/51 705/342 |
| 2011/0158222 | A1* | 6/2011 | Kerr | H04M 7/1205 709/227 |
| 2011/0182283 | A1* | 7/2011 | Van Buren | H04W 4/14 704/270.1 |
| 2012/0115448 | A1* | 5/2012 | Rosenhaft | G06Q 20/16 379/207.11 |
| 2014/0074950 | A1* | 3/2014 | Fan | H04L 51/063 709/206 |
| 2014/0115671 | A1* | 4/2014 | Abhyanker | G06F 21/31 726/4 |
| 2016/0027440 | A1* | 1/2016 | Gelfenbeyn | G10L 15/02 704/244 |
| 2017/0374198 | A1* | 12/2017 | de Silva | H04M 3/5191 |
| 2018/0337967 | A1* | 11/2018 | Ritchie | H04L 67/55 |
| 2020/0160849 | A1* | 5/2020 | Collins | G06Q 20/40145 |
| 2020/0356684 | A1* | 11/2020 | Sharma | G06F 21/606 |

\* cited by examiner

400

Access an authentication plan having an expression of phrase types
410

Repeat until expression evaluated

Select a phrase type from the expression
420

Access phrase verification method for the phrase type
430

Ask one or more questions to user based on phrase verification method
440

Receive one or more values from user
450

Determine whether expression evaluation complete
460

Determine result of evaluation of expression
460

FIG. 4

CUSTOMIZABLE VOICE-BASED USER AUTHENTICATION IN A MULTI-TENANT SYSTEM

BACKGROUND

Field of Art

This disclosure relates in general to voice-based user authentication in an online system, and in particular to customizable voice-based user authentication in a multi-tenant system.

Description of the Related Art

Online systems authenticate a user to verify identity of the user requesting access to the online system. Online systems may authenticate users by requesting credentials, for example, a password. Online systems may use other techniques such as challenge-response tests to authenticate users by asking questions that only a specific user is able to answer. Online systems typically use the same authentication procedure against all users.

Multi-tenant systems have multiple tenants as customers. Each tenant is an enterprise or an organization with multiple users that can connect with the multi-tenant system. Depending on the type of organization, the level of authentication required by an organization may vary. For example, certain organizations may process data that is not very sensitive and therefore does not require very strong authentication procedures. Other organizations may store sensitive information and may require strong authentication procedures. Online systems that use the same authentication procedure for all users are unable to meet the wide range of authentication demands of different organizations.

BRIEF DESCRIPTION OF DRAWINGS

FIG. 4 is a flow chart illustrating the process of execution of an authentication plan according to an embodiment.

Figure 1:
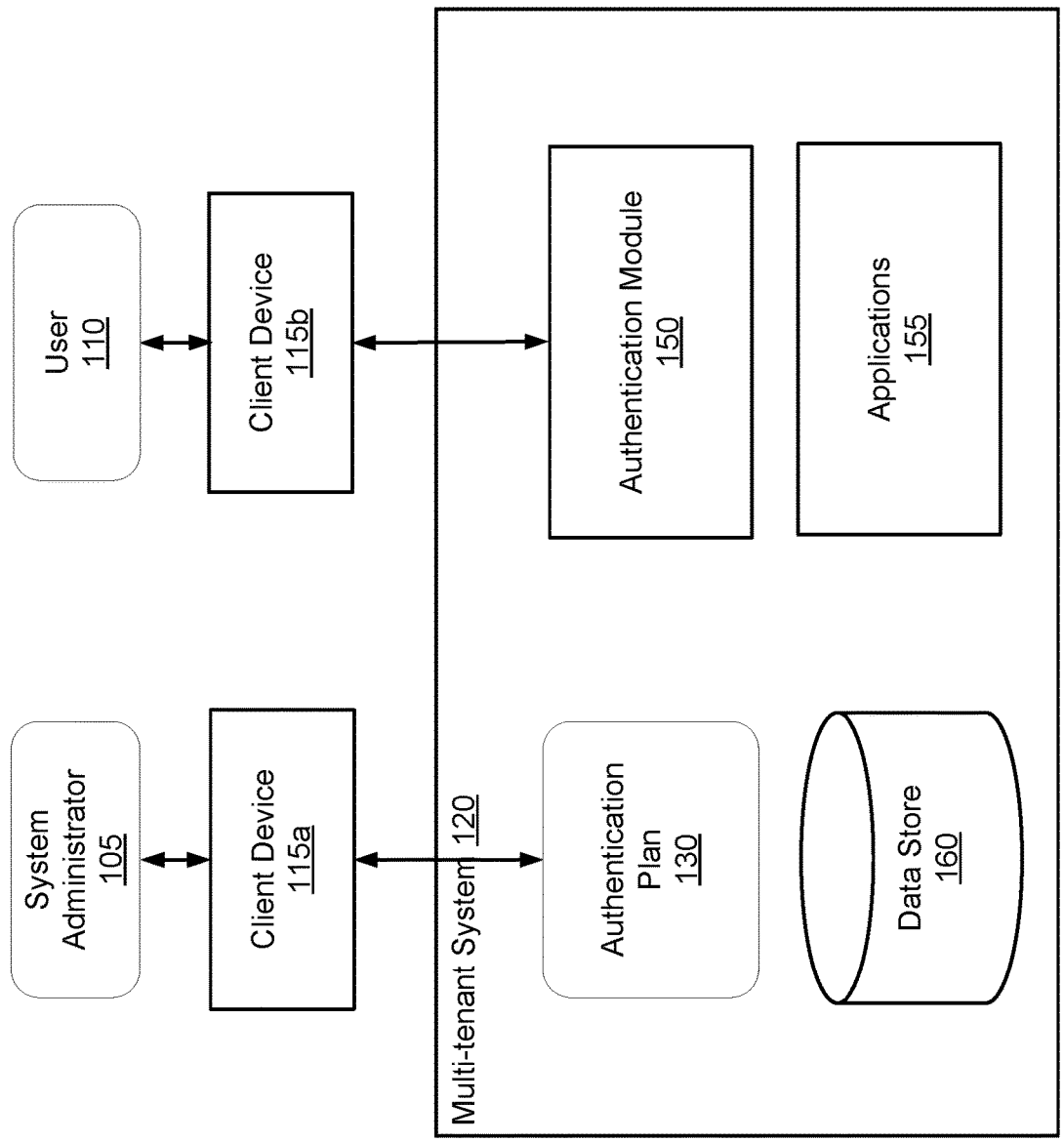
FIG. 1 is a block diagram of a system environment for performing authentication according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

Embodiments of the invention perform authentication of users using voice-based conversations. The online system may be a multi-tenant system that allows a tenant to customize the authentication process by specifying a tenant-specific authentication plan. The authentication plan is represented as an expression of phrase types. Phrase types represent types of phrases received as user responses as part of conversations with users. Examples of phrase types include name, address, email, zip code, and so on. Each phrase type is associated with a phrase verification method. For example, an address received from a user may be verified using a mapping service and any inconsistency in the address further confirmed with the user via a conversation. The process of authentication executes the phrase verification methods as specified by the expression of the authentication plan.

The multi-tenant system performs tenant-specific authentication as follows. The multi-tenant system receives a request for authentication from a user associated with a tenant. The multi-tenant system accesses a tenant-specific authentication plan for the tenant and performs a conversation based on the authentication plan. The multi-tenant system selects a phrase type from the expression and asks questions based on the phrase verification method of the phrase type. The system asks questions until the expression can be fully evaluated. The multi-tenant system allows or denies the requested access based on the result of evaluation of the expression.

The techniques disclosed herein can be used for authentication of other types of online systems that may not be multi-tenant systems. For example, an organization may use different authentication plans for different sets of users. Alternatively, the organization may maintain a single authentication plan that is customized over time as the authentication policies of the organization change.

According to an embodiment, the system identifies specific portions of a phrase that are likely to be inaccurate and focuses the conversation on these portions for confirmation. A portion of a phrase is called a sub-phrase. Accordingly, a phrase may include several sub-phrases. The system determines correctness of each sub-phrase (correctness of a phrase/sub-phrase is also referred to herein as the accuracy of the phrase/sub-phrase). The correctness of a phrase or a sub-phrase indicates whether the user correctly verified the phrase or sub-phrase. The system identifies one or more sub-phrases with less than a threshold correctness. The system asks questions as part of the conversation to confirm the identified sub-phrases. The system may verify the correctness of the entire phrase by comparing the phrase against phrases from a data source.

System Environment

FIG. 1 is a block diagram of a system environment 100 for performing authentication according to an embodiment. The system environment 100 includes a multi-tenant system 120 that communicates with users via client devices 115. The multi-tenant system 120 includes an authentication module 150, applications 155, and a data store 160. The multi-tenant system 120 may include other components not shown in FIG. 1, for example, other types of data stores, and so on. The system environment 100 may include other elements not shown in FIG. 1, for example, a network. In other embodiments, the multi-tenant system 120 may be any online system. The multi-tenant system 120 may be referred to herein as a system.

The multi-tenant system 120 allows multiple tenants to use the system, each tenant representing a group of users. The term tenant refers to an entity, for example, an organization or enterprise that is a customer of the multi-tenant system. As an example, a tenant may be a company that employs sales people that use the multi-tenant system 120 to manage their sales processes. The term tenant as used herein can refer to the set of users of the entire organization that is the customer of the multi-tenant system or to a subset of users of the organization. Accordingly, the tenant-specific authentication plan may be customized for a set of users, for example, the entire set of users of the organization, a specific group of users within the organization, or an individual user within the organization.

The multi-tenant system 120 stores data of multiple tenants and allows tenants to share applications running on the multi-tenant system. The application module 150 may run various applications that tenants are allowed to execute. For example, the application module 150 implements a web-based customer relationship management (CRM) system that executes CRM software applications and provides related data, code, forms, webpages and other information.

The data store 160 stores data for users of the multi-tenant system 120. A multi-tenant system may store data for multiple tenants in the same physical data store, for example, data store 160 but enforce a logical separation of data across tenants. As a result, one tenant does not have access to another tenant's data, unless such data is expressly shared. The data store 160 may be implemented as a relational database storing one or more tables. Each table contains one or more data categories logically arranged as columns or fields. Each row or record of a table contains an instance of data for each category defined by the fields. For example, a data store 160 may include a table that describes a customer with fields for basic contact information such as name, address, phone number, fax number, etc. Another table might describe a purchase order, including fields for information such as customer, product, sale price, date, etc.

Some users are privileged users, for example, system administrators who can perform specific actions that other users are not permitted to perform. For example, a system administrator can configure authentication procedure used for a tenant. The configuration procedure implemented by a system administrator may apply to all users of the tenant. In an embodiment, the system administrator specifies an authentication plan 130 to specify the authentication procedure for the tenant.

The authentication module 150 processes authentication plans. The authentication module 150 performs a conversation with the user according to the authentication plan. The authentication module 150 executes various processes further described herein.

The multi-tenant system 120 and client devices 115 shown in FIG. 1 represent computing devices. A computing device can be a conventional computer system executing, for example, a Microsoft™ Windows™-compatible operating system (OS), Apple™ OS X, and/or a Linux OS. A computing device can also be a device such as a personal digital assistant (PDA), mobile telephone, video game system, etc.

The client devices 115 may interact with the multi-tenant system 120 via a network (not shown in FIG. 1). The network uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

Although FIG. 1 describes use of authentication plans for customizing authentication across tenants in a multi-tenant system, the techniques disclosed herein apply to other contexts. For example, an online system can use customizable authentication plans to implement an evolving authentication process. An online system accesses and executes different authentication plans for different contexts. The online system may store different authentication plans for different contexts, for example, different authentication plans for different types of actions that a user may request. The online system may determine the type of action that a user requests and access the authentication plan that matches the action. For example, if a user requests to update certain types of sensitive records, the online system may execute an authentication plan that performs rigorous authentication. If the user requests an operation that is not very sensitive, for example, access certain documents, the online system executes a different authentication plan that performs less rigorous authentication.

System Architecture

Figure 2:
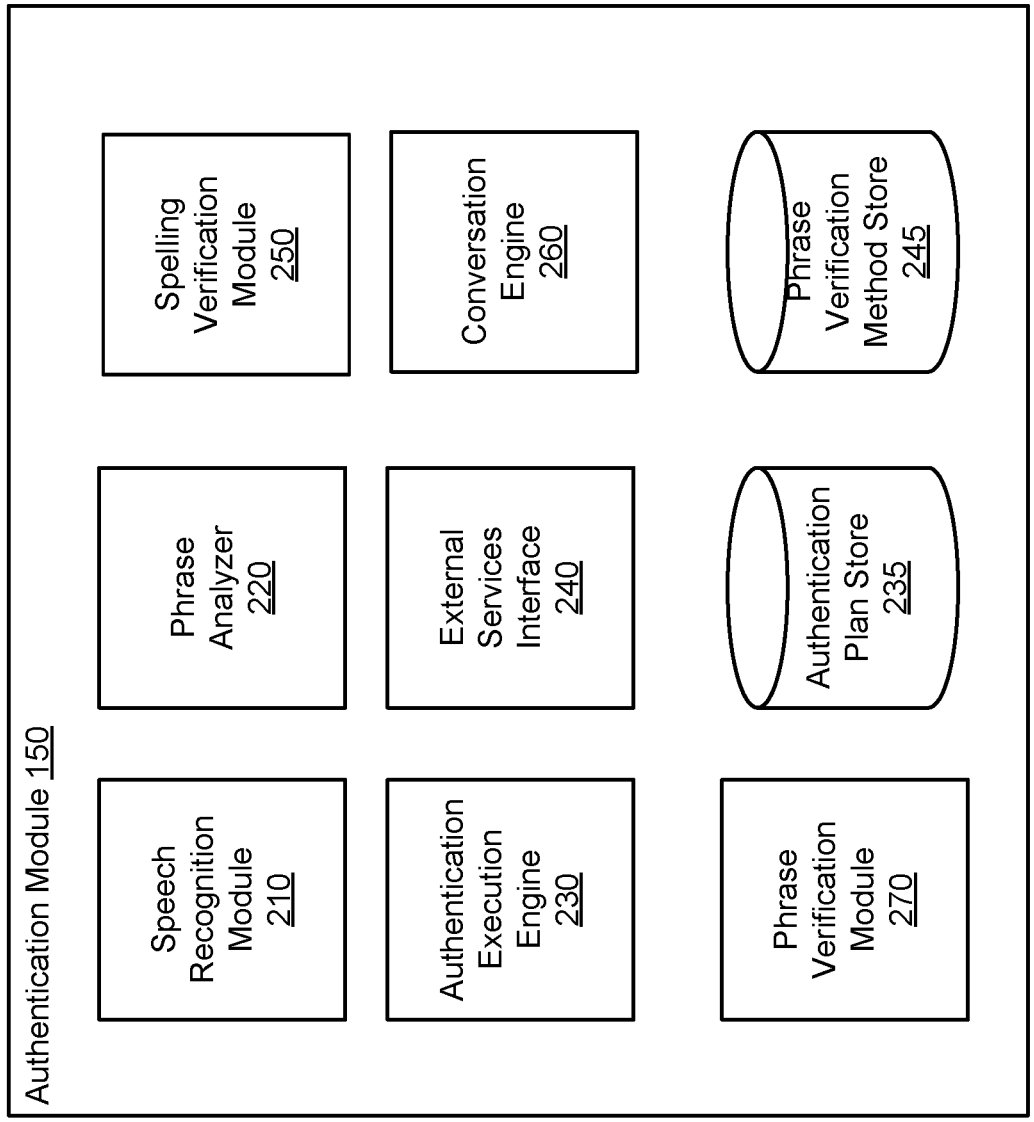
FIG. 2 is a block diagram illustrating components of the authentication module of the multi-tenant system, according to one embodiment.

FIG. 2 is a block diagram illustrating components of the authentication module of the multi-tenant system, according to one embodiment. The multi-tenant system 120 comprises a speech recognition module 210, a phrase analyzer 220, an authentication execution engine 230, an external services interface 240, a conversation engine 260, a phrase verification module 270, an authentication plan store 235, and a phrase verification method store 245. Other embodiments can have different and/or other components than the ones described here. Furthermore, the functionalities described herein can be distributed among the components in a different manner.

The speech recognition module 210 receives audio signal as input and converts the audio signal into text for further processing. The speech recognition module 210 allows a user to use voice for conducting conversations with the multi-tenant system 120. The output of the speech recognition module 210 is provided as input to other modules of the multi-tenant system 120, for example, the phrase analyzer 220. In an embodiment, the speech recognition module 210 provides a confidence level for a word that is recognized indicating a likelihood that the word was transcribed correctly. The phrase analyzer 220 considers the confidence level received from the speech recognition module 210 as a factor in determining the accuracy of a phrase and whether to confirm that particular portion of the phrase via a data source or by asking the user to repeat the phrase, repeat a portion of the phrase, or spell the phrase or a portion of the phrase.

The conversation engine 260 performs natural language conversations with users. The conversation engine 260 asks questions to users for authentication purposes and receives natural language answers from users. The conversation engine 260 generates dialogs that are presented to the user. The conversation engine tracks state of a conversation to make sure that various questions are answered. The conversation engine 260 provides the answers received from users to various modules of the authentication module 150. If the user is using a voice based interface for the conversation, the conversation engine 260 uses the speech recognition module 210 to convert the audio signal received to text for further processing.

The phrase analyzer 220 determines the phrase types of different phrases received as user responses by the authentication module 150. A user may speak into a microphone and provide an audio signal that is transcribed by the speech recognition module 210 into one or more sentences. These sentences are analyzed by the phrase analyzer 220 to identify various phrases, for example, based on a parts of speech analysis of the sentences. The phrase analyzer 220 determines the phrase types of each of these phrases. Examples of phrase types include name, address, zip code, date, and so on.

The phrase verification method store 245 stores one or more phrase verification methods for each phrase type. A phrase verification method verifies the accuracy of a phrase. A phrase verification method is represented as a set of instructions that can be invoked. Different types of phrases may be verified using different methods. For example, a phrase of type name may be verified by requesting the user to spell the name. A phrase of type address may be verified by sending the address to a mapping service and verifying if the address corresponds to a physical address of a location. Furthermore, if a portion of the address is determined to be different from a known physical address of a location, the phrase verification method requests the user to repeat these specific portions of the address or to spell them.

The authentication execution engine 230 receives an authentication plan and executes it to authenticate a user. The authentication plan includes a logical expression of phrases types. The logical expression connects various phrase types by logical operators, for example, OR, AND, and so on. The authentication execution engine 230 evaluates the expression by executing the phrase verification methods of the phrase types in the expression. The execution of each phrase verification method returns a value indicating whether the phrase verification was successful or not. The authentication execution engine 230 evaluates the expression based on the values returned for each phrase verification method. If the expression evaluation indicates success, the authentication execution engine 230 authenticates the user. In an embodiment, the execution of each phrase verification method returns a measure of accuracy of the phrase indicating whether the user accurately verified the phrase or not. The authentication execution engine 230 determines whether authentication is successful based on the authentication plan by aggregating the measure of accuracy of individual phrase verification methods of the plan. In an embodiment, authentication execution engine 230 may determine a measure of accuracy of the authentication plan by aggregating the measure of accuracy of individual phrase verification methods of the plan. The authentication execution engine 230 determines that the authentication is successful if the measure of accuracy is above a threshold value. The authentication execution engine 230 allows access to the user if the accuracy of the authentication plan based on the conversation with the user exceeds a threshold value.

The phrase verification module 270 receives a phrase of a particular phrase type and accesses the phrase verification method for that phrase type from the phrase verification method store 245. The phrase verification module 270 executes the instructions of the phrase verification method. The phrase verification module 270 is invoked by the authentication execution engine 230 while evaluating an authentication plan.

The external services interface 240 interacts with external services to perform verifications of certain types of phrases. For example, the external services interface 240 verifies accuracy of addresses using a mapping service. Accordingly, the external services interface 240 sends a phrase representing an address to a mapping service and checks if the address represents an actual physical address of a location. In an embodiment, the external services interface 240 receives from the mapping service a physical address that is textually closest to the address being verified. The external services interface 240 provides a measure of accuracy indicating that the address received from user is not accurate and also provides an actual address that is similar to the address being verified. This allows the authentication module 150 to identify differences between the address being verified and the actual address and focus on the portions that are different to continue the verification process.

The spelling verification module 250 verifies spellings of keywords if necessary. For example, if the authentication module 150 determines that a portion of a phrase is likely to be inaccurate, the spelling verification module 250 may request the user to spell one or more keywords from that portion of the phrase to further verify the phrase. The spelling verification module 250 implements processes further described herein to allow users to provide the spelling in various ways.

The authentication plan store 235 stores authentication plans for various tenants. In an embodiment, the authentication plan store 235 stores a default authentication plan that is used for tenants that have not customized their authentication plans. The authentication plan may be stored as a text document using a predefined syntax.

Authentication Plan

Figure 3:
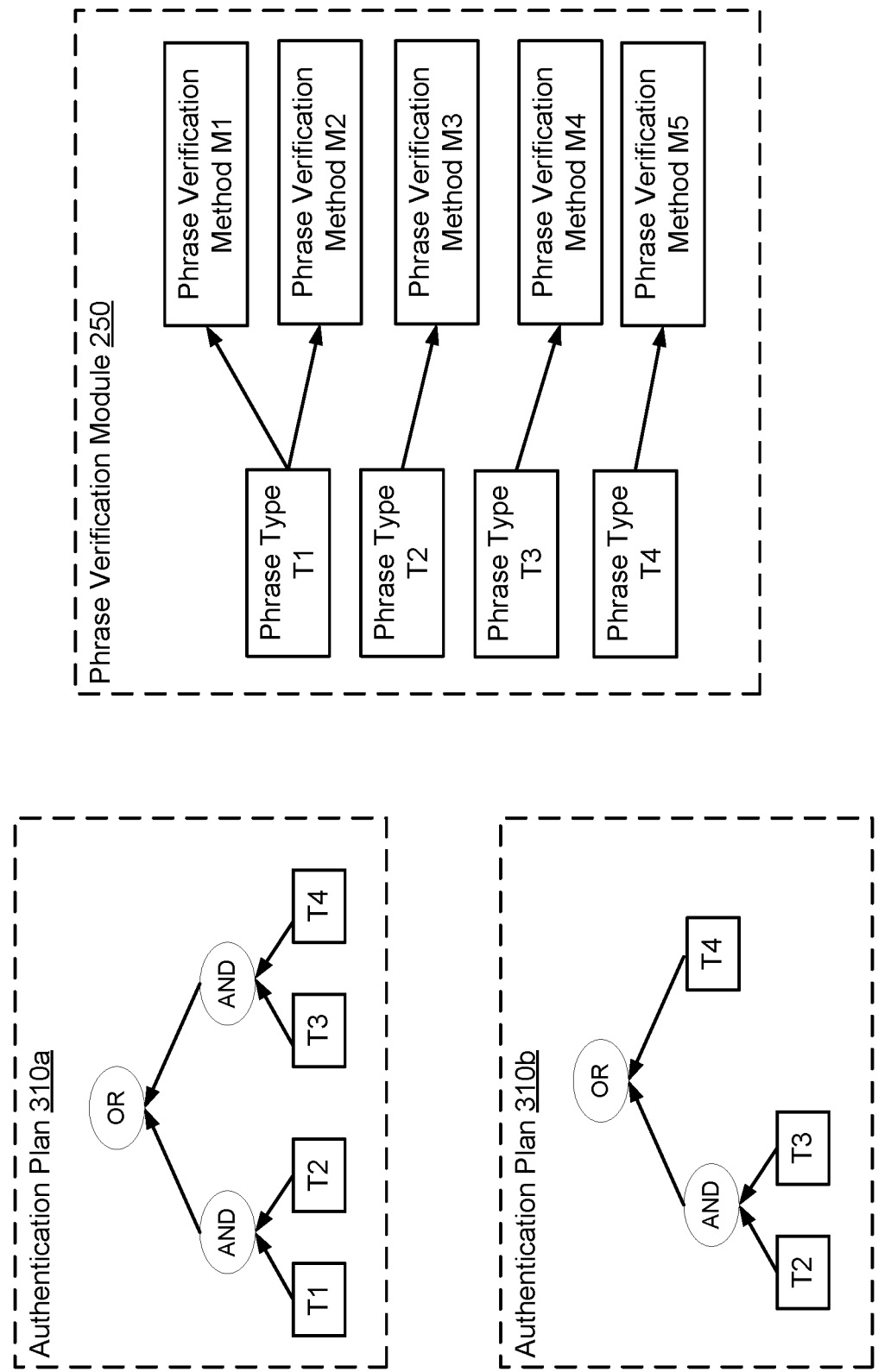
FIG. 3 is a diagram illustrating various data structures used for processing an authentication plan, according to an embodiment.

The authentication module 150 generates various data structures for processing an authentication plan. FIG. 3 is a diagram illustrating various data structures used for processing an authentication plan, according to an embodiment. The phrase verification module 250 stores one or more phrase verification methods to each phrase type. Examples of phrase types include phrase type T1, T2, T3, and T4. The phrase type T1 is associated with phrase verification methods M1 and M2, phrase type T2 is associated with phrase verification method M3, phrase type T3 is associated with phrase verification method M4, and so on.

In an embodiment, the authentication module 150 receives a specification of various phrase types and corresponding phrase verification methods as a document. Following is an example of a document specifying various phrase types and corresponding phrase verification methods.

Phrase:
    name:
      method: SPELLING
    delivery address:
      method: MAPPING_SERVICE
    email address:
      method: SPELLING
    zip code:
      method:
        SPELLING
        MAPPING_SERVICE In the above specification, phrase type "name" has phrase verification method SPELLING indicating that the authentication module should verify phrases of type "name" by asking users to spell the name. The phrase type "delivery address" has phrase verification method MAPING_SERVICE indicating that the authentication module should confirm the location using a mapping service. Similarly, phrase type "email address" has phrase verification method SPELLING. Phrase type "zip code" has multiple phrase verification methods, SPELLING and MAPPING_SERVICE.

In some embodiments, if a phrase type is associated with multiple phrase verification methods, the authentication module 150 executes each phrase verification method to confirm the phrase. In other embodiments, if a phrase type is associated with multiple phrase verification methods, the authentication module 150 may execute any one phrase verification method to confirm the phrase. Accordingly, if one phrase verification method fails, the authentication module 150 executes another phrase verification method. The authentication module 150 executes the phrase verification methods until one succeeds. If none of the phrase verification methods succeed, the authentication module 150 determines that the phrase could not be verified successfully.

FIG. 3 further illustrates authentication plans 310a and 310b. The different authentication plans may be tenant-specific authentication plans in a multi-tenant system. Alternatively, the different authentication plans may be context-specific authentications plans for an online system. Each authentication plan is an expression based on phrase types. In an embodiment, the authentication plan is a logical expression in which phrase types are connected by logical operators, for example, AND and OR.

If the authentication execution engine 230 receives an authentication plan with an expression comprising two or more phrase types connected by an AND operator, the authentication execution engine 230 ensures that the phrase verification methods of each of these phrase types must be successfully executed. Accordingly, if any one of the phrase types cannot be successfully verified, the AND expression evaluates to a FALSE value indicating that authentication based on the expression was not successfully executed.

If the authentication execution engine 230 receives an authentication plan with an expression comprising two or more phrase types connected by an OR operator, the authentication execution engine 230 ensures that the phrase verification methods of at least one of these phrase types is successfully executed. Accordingly, if any one of the phrase types can be successfully verified, the OR expression evaluates to a TRUE value indicating that authentication based on the expression was successfully executed.

An authentication plan can be an expression that is a combination of OR an AND operators. The authentication execution engine 230 executes the authentication plan according to the rules described herein. If the overall evaluation of the expression results in a TRUE value, the authentication module 150 determines that the authentication was successful.

Other embodiments may use other ways of specifying authentication instructions. For example, following is a script that is equivalent to an authentication expression.

verify_user:
  entity:
    E1:
      name
      delivery address
    E2:
      email address
      zip code
      order id
  success:
    OR:
      VERIFY:
        E1
      VERIFY:
        E2

The above specification defines variables E1 and E2 as lists of phrase types. The variables E1 and E2 represent subexpressions of the overall authentication expression of the authentication plan. Each variable E1, E2 represents an AND expression based on the phrase types listed for the variable. For example, variable E1 represents an AND of name and delivery address phrase types and the variable E2 represents an AND of email address, zip code, and order id phrase types. Furthermore, the authentication plan specifies that the authentication expression is an OR operation performed on E1 and E2. An AND expression evaluates successfully if all sub-expressions of the AND expression evaluate successfully indicating the user verified that part of authentication successfully. An OR expression evaluates successfully if any one of the sub-expressions of the OR expression evaluates successfully.

Authentication Processes

Various processes related to authentication are illustrated in FIGS. 4-8. Other embodiments can perform the steps of these flowcharts in different orders. Furthermore, various embodiments can include different and/or additional steps than the ones described herein.

FIG. 4 is a flow chart illustrating the process of execution of an authentication plan according to an embodiment. The authentication module 150 performs authentication of a user in accordance with tenant-specific authentication plans of the tenant of the user.

The authentication module 150 receives a request for authentication for a user associated with a tenant of the multi-tenant system 120. The authentication module 150 accesses the tenant-specific authentication plan for the tenant of the user. The authentication module 150 processes the expression of the authentication plan. The authentication module 150 may parse the specification of the expression to build a data structure, for example, a data structure illustrated in FIG. 3. The expression connects a plurality of phrase types using logical operators. The authentication module 150 repeats the following steps 420, 430, 440, 450, and 460 until the authentication expression is evaluated.

The authentication module 150 selects a phrase type from the expression. The authentication module 150 accesses the phrase verification method for the phrase type from the phrase verification method store 245. If there are multiple phrase verification methods for the phrase type, the authentication module 150 accesses all of them. The authentication module 150 loads the instructions of the phrase verification method in memory and executes them.

The authentication module 150 may ask 440 one or more questions to the user as part of execution of the phrase verification method. These questions may be asked via a chatbot and form part of a chatbot conversation performed by the authentication module 150. The authentication module 150 receives one or more values in response to the questions presented to the user.

The authentication module 150 determines 460 whether the expression evaluation is complete. For example, if the expression includes an OR operator connecting various subexpressions, the authentication module 150 determines the expression evaluation to be complete if any one of the subexpressions evaluates to true, indicating successful authentication by the user based on that subexpression. If the expression includes an AND operator connecting various subexpressions, the authentication module 150 determines that the expression evaluation is complete if all of the subexpressions evaluate to true, indicating successful authentication based on all subexpressions. Furthermore, if the user fails authentication based on any one subexpression of an AND expression, the authentication module 150 determines that the expression evaluation is complete with an indication that the user failed authentication according to the AND expression.

The authentication module 150 determines the overall result of evaluation of the expression based on the above chatbot conversation with the user. The authentication module 150 may determine that the expression evaluated as a success indicating the user can be authenticated or the expression evaluated as a failure indicating the user failed authentication.

Figure 5:
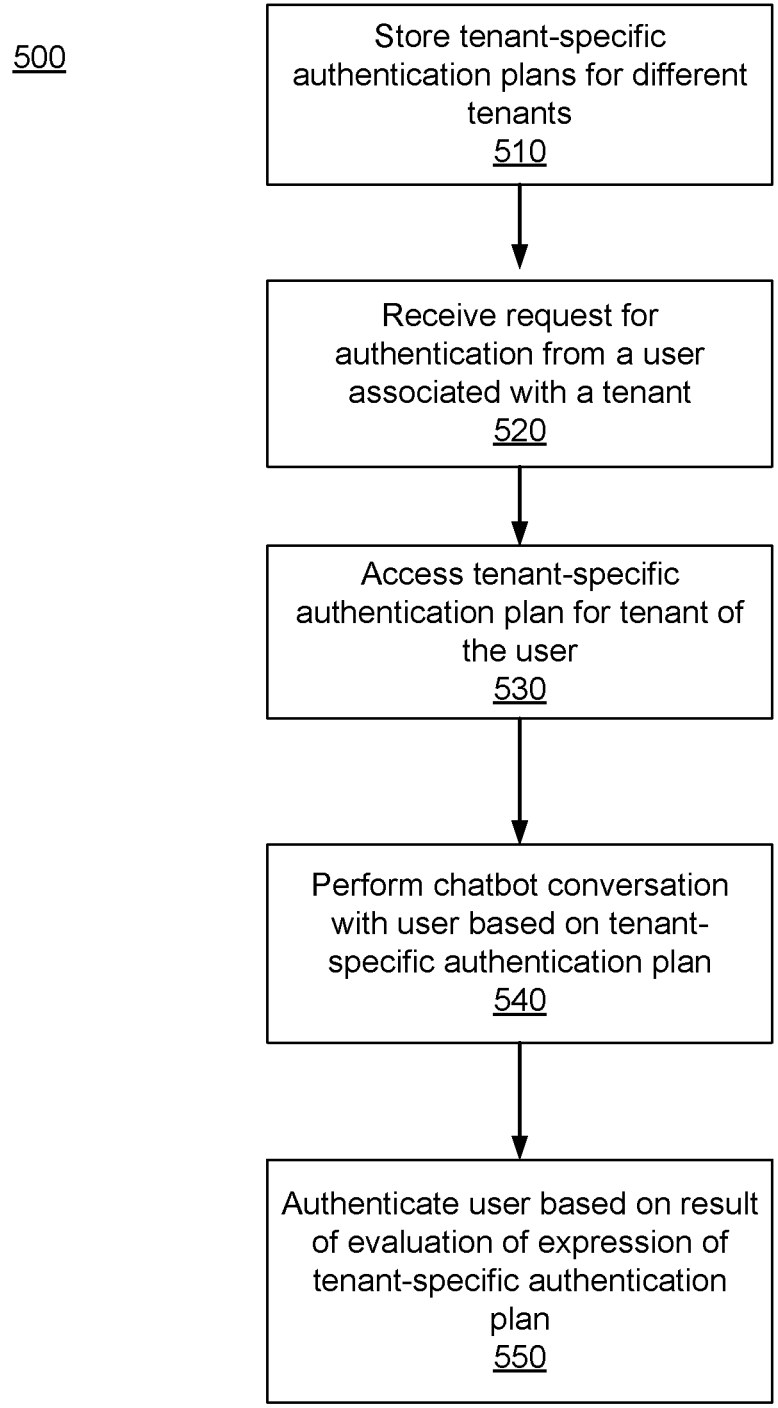
FIG. 5 is a flow chart illustrating the process of tenant-specific authentication in a multi-tenant system according to an embodiment.

The evaluation of expressions in an authentication plan can be used for tenant-specific authentication by a multi-tenant system 120. FIG. 5 is a flow chart illustrating the process of tenant-specific authentication in a multi-tenant system according to an embodiment. The authentication module 150 stores 510 tenant-specific authentication plans for different tenants in authentication plan store. The authentication plans may be provided by system administrators of different tenants. The authentication module 150 may store a default authentication plan for tenants that do not customize the authentication plan.

The authentication module 150 receives 520 a request for authentication from a user of a tenant. The request may be for performing certain action using the multi-tenant system 120, for example, to access a record, to update a record, to delete a record and so on. The authentication is required to ensure that the user has the appropriate permissions to perform the requested action.

The authentication module 150 accesses 530 a tenant-specific authentication plan for the tenant of the user. The authentication module 150 may load the tenant-specific authentication plan from the authentication plan store 235. The authentication module 150 performs chatbot conversation with the user in accordance with the authentication plan, for example, as described in connection with the process illustrated in the flowchart of FIG. 4. The authentication module 150 authenticates the user according to the result of evaluation of the expression specified in the tenant-specific authentication plan. For example, if the evaluation of the expression indicates a successful authentication, the authentication module 150 authenticates the user and the multi-tenant system 120 allows the user to perform the requested action.

The techniques disclosed herein are not limited to authentication in a multi-tenant system. The authentication module 150 can operate in any online system. For example, an online system may store multiple authentication plans for different sets of users. An organization may divide users of the online system into different groups and apply different authentication plans to each group. This allows the online system to customize authentication for each user group. An organization may maintain only one authentication plan but customize it over time, for example, as policies of the organization change over time.

Figure 6:
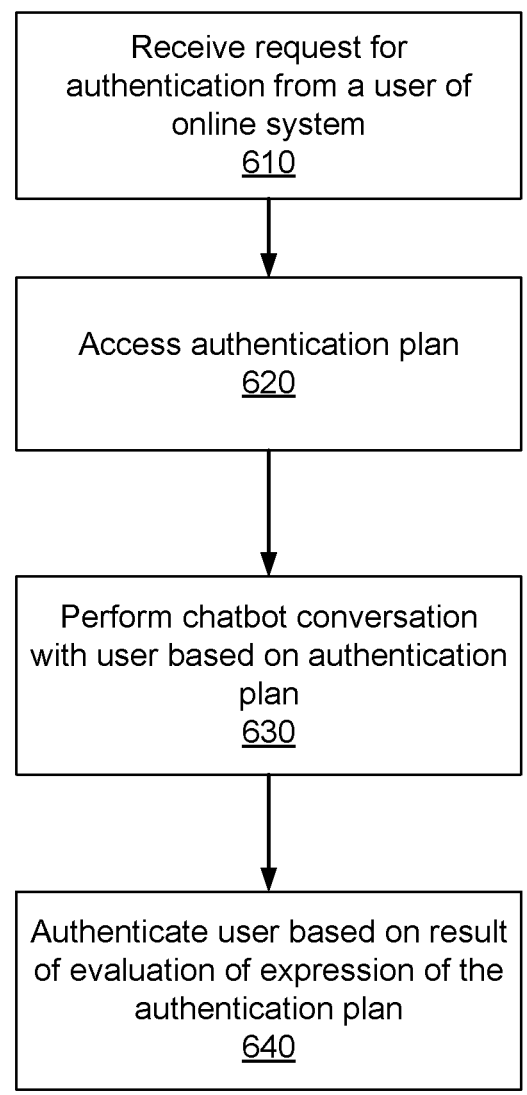
FIG. 6 is a flow chart illustrating the process of customized authentication in an online system according to an embodiment.

FIG. 6 is a flow chart illustrating the process of customized authentication in an online system according to an embodiment. The authentication module 150 stores an authentication plan. The authentication plan may be customized for specific set of users or for specific purpose. Or the authentication plan may be a default authentication plan provided by the online system.

The authentication module 150 receives 610 a request for authentication from a user of a tenant. The request may be for performing certain action using the online system, for example, to access a record, to update a record, to delete a record and so on. The online system performs authentication to ensure that the user has the appropriate permissions to perform the requested action.

The authentication module 150 accesses 620 the authentication plan from the authentication plan store 235. The authentication module 150 performs 630 chatbot conversation with the user in accordance with the authentication plan, for example, as described in connection with the process illustrated in the flowchart of FIG. 4. The authentication module 150 authenticates 640 the user according to the result of evaluation of the expression specified in the authentication plan.

Figure 7:
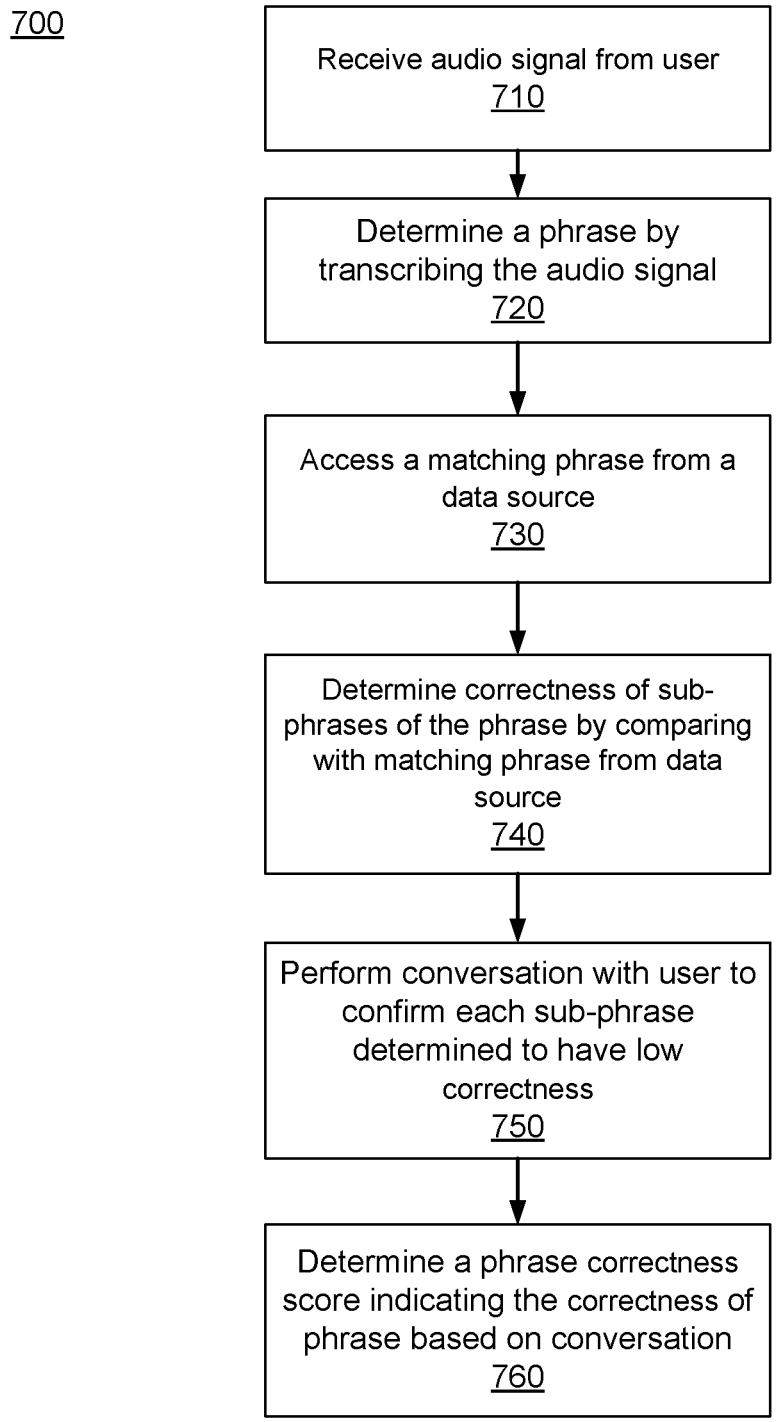
FIG. 7 is a flow chart illustrating the process of intelligent confirmation of sub-phrases according to an embodiment.

FIG. 7 is a flow chart illustrating the process of intelligent confirmation of sub-phrases according to an embodiment. The authentication module 150 receives an audio signal from a user. The audio signal may represent a phrase said by the user in a microphone. For example, the phrase may be in response to a question presented by an online system as part of a chatbot conversation. The authentication module 150 determines 720 a phrase by transcribing the audio signal. The phrase may be any text string, for example, a sentence.

The authentication module 150 connects with a data source to find a matching phrase. The authentication module 150 interacts with a data source that allows an approximate or fuzzy search with a query string that returns records that may not match the input query string exactly. The data source ranks the matching results in order of a degree of match between the query string and the records. For example, a mapping service receives an address that may be incorrect and searches for all addresses that have a close match with the input address. Similarly, a database may receive a search query and find all records that match the search query even if the matches are not exact and ranks them using a metric that indicates a degree of match between the record and the query string. If the search is for a particular name, the database has a query interface to return all names that approximately match the input name. The data source may be an external data source, for example, a web service and the interaction with the data source may be performed by the external services interface 240.

The authentication module 150 compares the received results from the data source against the input phrase to identify portions of the phrase that are inaccurate. The portions of the phrase are referred to as sub-phrases. A sub-phrase may be a keyword or a portion of a keyword. For example, if the credentials provided by the user match a particular user of the multi-tenant system 120, the authentication module 150 accesses the various records of the user including the address, data of birth, and so on. The authentication module 150 performs conversation with the user to request specific information, for example, by asking the user "what is your address?" The authentication module 150 compares the address provided by the user against the address that is stored in the database of the multi-tenant system.

As another example, if the phrase represents a name, the authentication module 150 compares the input name against a similar name received from a database and identifies portions of the input name against the names received from the database to determine substrings of the name that fail to match. If the input phrase is an address the authentication module 150 identifies portions of the address that fail to match. For example, the apartment number may fail to match while the rest of the address matches or the street name may fail to match while the remaining address matches.

The conversation engine 260 performs 750 a conversation with the user to further confirm the portions of the phrase that were determined to be inaccurate or were determined to have a measure of correctness below a threshold value. For example, if the apartment number of the address failed to match any given address the conversation engine 260 may present a dialog to the user requesting the user to provide the address again.

As part of the conversation, the user may correct the information or may provide incorrect information again. The authentication module 150 determines a measure of the overall correctness of the phrase provided by the user based on the conversation with the user. The term accuracy may be used instead of the term correctness herein. For example, if the entire phrase provided by the user is determined to be correct, the authentication module 150 determines the authentication to be successful. However, if certain sub-phrases of the phrase received fail to match, the authentication module 150 determines a phrase correctness score of the phrase based on the type of data represented by the phrase and the amount of mismatch based on the number of sub-phrases that failed to match and a degree of mismatch. The authentication module 150 may determine a degree of mismatch between two phrases based on a distance metric, for example, Levenshtein distance or any aggregate value representing differences in characters of the two terms.

The authentication module 150 receives phrase accuracy scores for different phrases that are verified by phrase verification methods and determines a weighted aggregate score representing an authentication score for the user by aggregating the phrase accuracy scores. Certain types of information are assigned higher weight than others. For example, an error in a phrase representing the name of the user is assigned higher weight than a phrase representing an address. The authentication module 150 authenticates the user by comparing the overall authentication score for the user with a threshold value. If the comparison indicates high accuracy of the information provided by the user during the conversation, the authentication module 150 authenticates the user.

Figure 8:
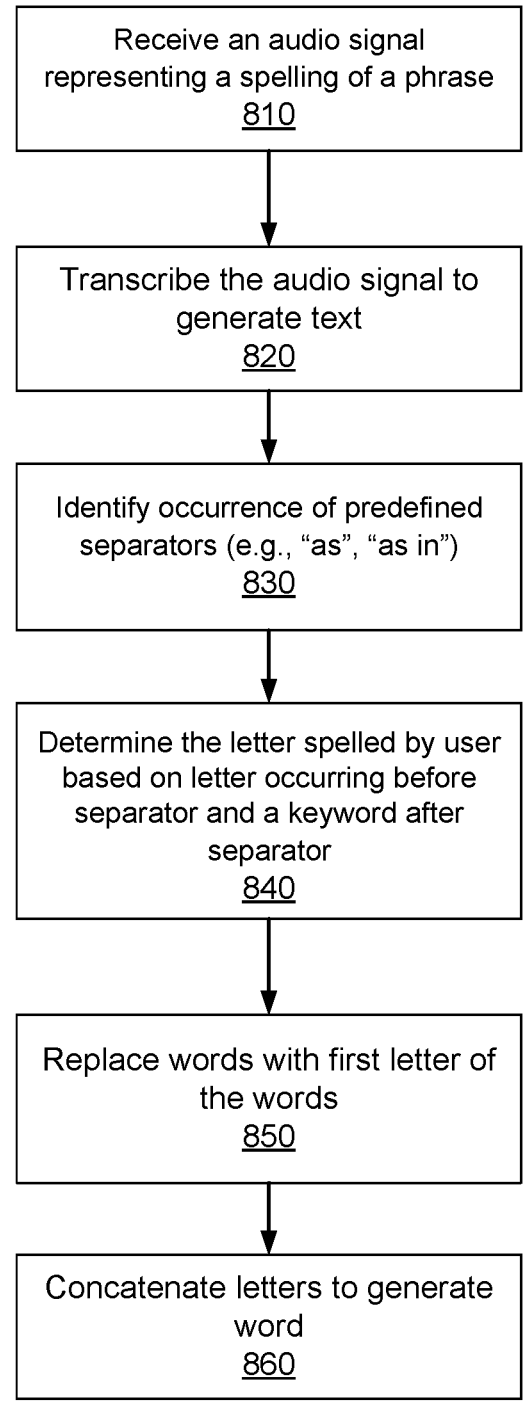
FIG. 8 is a flow chart illustrating the process of intelligent spelling verification according to an embodiment.

FIG. 8 is a flow chart illustrating the process of intelligent spelling verification according to an embodiment. Various steps of the process may be performed by the spelling verification module 250, speech recognition module 210, and other modules within authentication module 150. The authentication module 150 receives 810 an audio signal representing a spelling of a phrase by the user. The audio signal may have been received in response to a question presented to the user by the conversation engine 260 as part of a conversation. For example, the conversation engine 260 may ask a question "can you please spell your name?" or "can you please spell the name of the street in the address?"

The speech recognition module 210 transcribes the audio signal to generate text representing the audio signal so that the authentication module 150 can perform text processing of the input. The authentication module 150 determines a spelling of the phrase from the text input representing the audio signal. In an embodiment, the authentication module 150 builds a data structure for example, a vector or a linked list representing the letters of the spelling of the phrase as provided by the user.

The spelling verification module 250 identifies occurrences of predefined separators in the input. Examples of separators are "as" or "as in". The authentication module 150 determines whether the user spelled some words by using sub-phrases such as "b as boy" or "n as in Nancy." The spelling verification module 250 determines 840 a letter spelled by the user based on the letter occurring immediately before a separator and the first letter of the keyword occurring immediately after the separator. The spelling verification module 250 determines the keyword before the separator and after the separator. The spelling verification module 250 determines whether the keyword before the separator represents a letter. The spelling verification module 250 extracts the first letter of the keyword following the separator and compares with the letter occurring immediately before the separator. If the two letters match, the spelling verification module 250 replaces the sub-phrase comprising the separator, the letter preceding the separator and the keyword occurring after the separator with the letter in the spelling.

The spelling verification module 250 identifies any remaining words that the user provided that do not map to a letter based on the above processing. The spelling verification module 250 may generate alternate spellings by concatenating 860 the various letters. In one embodiment, the spelling verification module 250 generates one potential spelling by replacing the remaining keywords with the first letter of each keyword.

In another embodiment, if the spelling verification module 250 identifies a sequence S1 of consecutive keywords that has a plurality of keywords, the spelling verification module 250 replaces the sequence with a sequence S2 comprising the first letter of each keyword from the sequence S1. If the keyword that is not replaced by a letter occurs by itself, i.e., a sequence of length one that is not adjacent to another keyword that is not replaced by a letter, the spelling verification module 250 determines an alternate spelling by replacing the keyword by the spelling of the keyword. Accordingly, if the user says, "b as in boy, rain", the spelling verification module 250 replaces the sub-phrase "b as in boy" with the letter b to determine the string "b rain". The spelling verification module 250 may generate two alternate spellings, one by spelling out the keyword rain to generate spelling "b r a i n" and another by replacing the keyword "rain" with the first letter "r" to determine the spelling as "b r".

The spelling verification module 250 generates the spelling of the phrase by concatenating 860 the letters determined by the various steps. The conversation engine 260 may verify the spelling by repeating the determined spelling to the user, for example, by asking "did you mean b r a i n?"

In an embodiment, the authentication module 150 performs intelligent queries as part of conversation to verify authenticity of the user. The authentication module 150 stores several common-sense or general knowledge questions in a data source. For each question, the authentication module 150 stores mechanisms to verify correctness of the answer. For example, the authentication module 150 may store keywords that are expected to be included in the answer. Examples of questions asked as part of intelligent querying include asking user to describe a term or a keyword, for example, "what is a VIN number", "describe fall season", and so on.

The authentication module 150 receives an audio signal representing the answer provided by the user in response to the question and transcribes the answer to obtain text. The authentication module 150 analyzes the text to verify correctness of the answer. The authentication module 150 may compare keywords that occur in the text with predefined keywords that are expected in the answer. In an embodiment, the authentication module 150 performs natural language processing of the received phrase to identify various types of entities encountered in the phrase and compares them with predefined entities that are expected. Examples of entities that are identified include names, dates, email, zip code, and so on.

Computer Architecture

Figure 9:
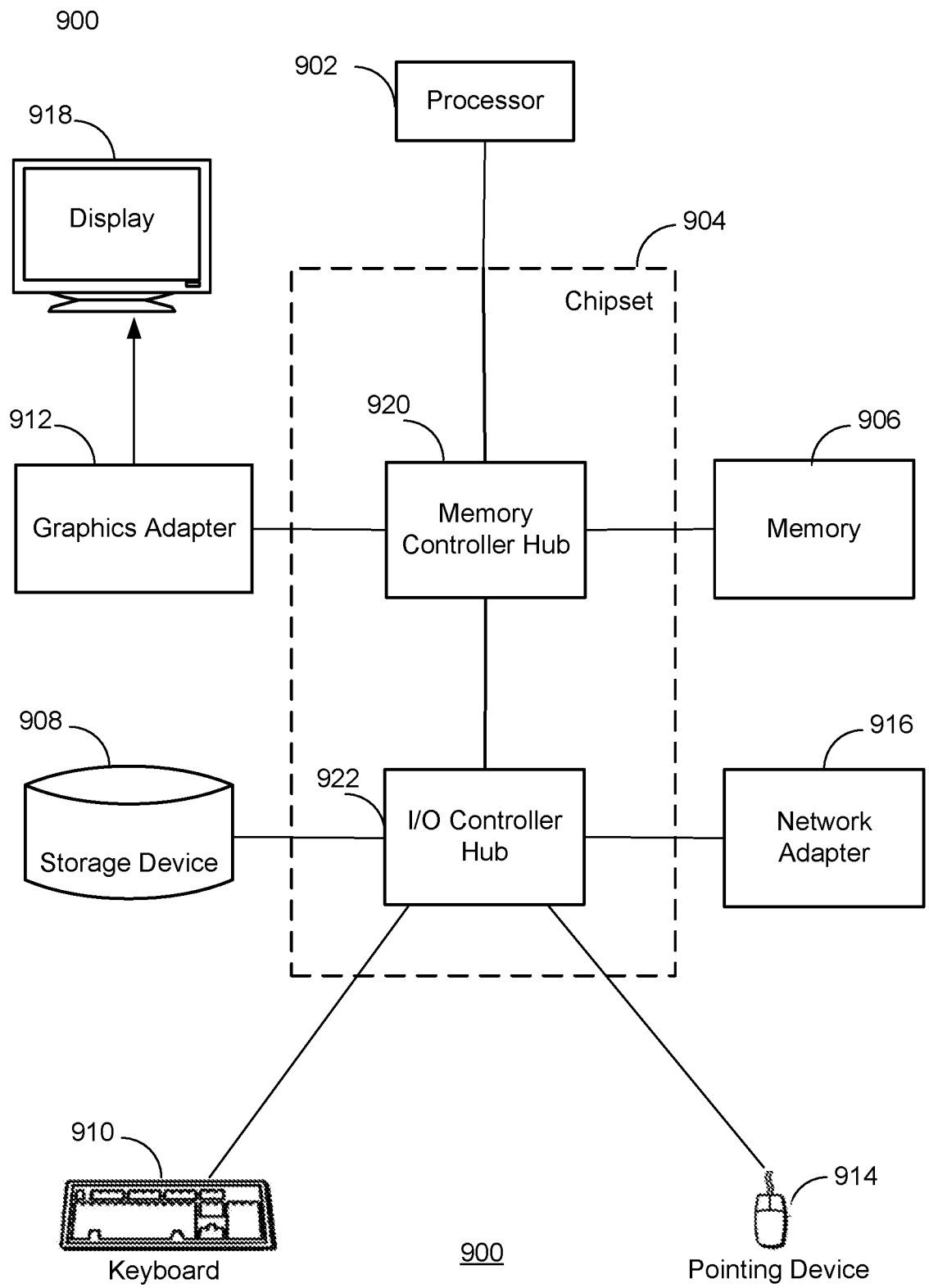
FIG. 9 is a block diagram illustrating a functional view of a typical computer system according to one embodiment.

FIG. 9 is a high-level block diagram illustrating a functional view of a typical computer system for use as one of the entities illustrated in the environment 100 of FIG. 1 according to an embodiment. Illustrated are at least one processor 902 coupled to a chipset 904. Also coupled to the chipset 904 are a memory 906, a storage device 908, a keyboard 910, a graphics adapter 912, a pointing device 914, and a network adapter 916. A display 918 is coupled to the graphics adapter 912. In one embodiment, the functionality of the chipset 904 is provided by a memory controller hub 920 and an I/O controller hub 922. In another embodiment, the memory 906 is coupled directly to the processor 902 instead of the chipset 904.

The storage device 908 is a non-transitory computer-readable storage medium, such as a hard drive, compact disk read-only memory (CD-ROM), DVD, or a solid-state memory device. The memory 906 holds instructions and data used by the processor 902. The pointing device 914 may be a mouse, track ball, or other type of pointing device, and is used in combination with the keyboard 910 to input data into the computer system 900. The graphics adapter 912 displays images and other information on the display 918. The network adapter 916 couples the computer system 900 to a network.

As is known in the art, a computer 900 can have different and/or other components than those shown in FIG. 9. In addition, the computer 900 can lack certain illustrated components. For example, a computer system 900 acting as a multi-tenant system 120 may lack a keyboard 910 and a pointing device 914. Moreover, the storage device 908 can be local and/or remote from the computer 900 (such as embodied within a storage area network (SAN)).

The computer 900 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 908, loaded into the memory 906, and executed by the processor 902.

The types of computer systems 900 used by the entities of FIG. 1 can vary depending upon the embodiment and the processing power used by the entity. For example, a client device 115 may be a mobile phone with limited processing power, a small display 918, and may lack a pointing device 914. The multi-tenant system 120, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer implemented method for tenant-specific authentication of users in a multi-tenant system using chatbot conversation, the method comprising:
for each of a plurality of tenants, receiving a tenant-specific authentication plan comprising an expression based on phrase types, each phrase type associated with a phrase verification method;
receiving a request for authentication from a user associated with a tenant;
accessing a tenant-specific authentication plan for the tenant, the tenant-specific authentication plan specifying an expression;
performing a chatbot conversation with the user based on the tenant-specific authentication plan, comprising:
selecting a phrase type from the expression;
asking one or more questions to the user based on the phrase verification method corresponding to the selected phrase type;
receiving a phrase from the user in response to the one or more questions;
extracting one or more values from the received phrase; and
evaluating the authentication expression based on the extracted values;
authenticating the user associated with the tenant according to a result of the evaluation of the expression.

2. The method of claim 1, wherein performing the chatbot conversation comprises using a data source to identify potential inaccuracies in the extracted one or more values by:
comparing the extracted one or more values against data from a data source;
determining that a portion of the extracted one or more values matches the data and that a portion of the extracted one or more values does not match the data; and
asking one or more questions regarding the portion of the extracted one or more values that does not match the data.

3. The method of claim 2, wherein the phrase type is a physical address and the data source is a mapping service that provides addresses similar to the phrase type.

4. The method of claim 1, wherein the phrase type is a user name and the phrase verification method requests spelling of the user name.

5. The method of claim 1, wherein the phrase type is a physical address and the phrase verification method uses a web service to verify correctness of the address.

6. The method of claim 1, wherein the phrase type is an email address and the phrase verification method requests spelling of at least a portion of the email address.

7. The method of claim 1, wherein performing the chatbot conversation comprises:
requesting a user to provide spelling of a phrase;
receiving an audio signal from the user representing a user provided spelling of the phrase;
transcribing the audio signal to generate a text string;
extracting one or more alternate spellings of the phrase from the generated text string.

8. The method of claim 7, wherein extracting an alternate spelling of the phrase from the generated text string comprises:
identifying an occurrence of a predefined separator in the text string;
determining that a keyword immediately preceding the separator represents a letter;
determining whether the letter matches a first letter of a keyword immediately following the separator;
responsive to the letter matching the first letter of the keyword immediately following the separator, determining that a sub-phrase comprising the separator, the keyword immediately preceding the separator and the keyword immediately following the separator represent the letter.

9. A computer implemented method for authentication of users in an online system using chatbot conversation, the method comprising:
receiving a request for authentication from a user;
receiving a voice signal from the user in response to a question presented to the user;
determining a phrase based on the voice signal, the phrase comprising a plurality of sub-phrases;
extracting one or more values from the phrase;
determining a measure of correctness of each sub-phrase from the plurality of sub-phrases;
identifying one or more sub-phrases having less than threshold correctness;
performing a chatbot conversation with the user comprising, for each of the identified sub-phrases, asking one or more questions to the user for confirming the sub-phrase;
evaluating the correctness of the phrase based on the chatbot conversation; and
authenticating the user based on the correctness of the phrase.

10. The method of claim 9, wherein performing the chatbot conversation comprises using a data source to identify potential inaccuracies in the extracted one or more values by:
comparing the extracted one or more values against data from a data source;
determining that a portion of the extracted one or more values matches the data and that a portion of the extracted one or more values does not match the data; and
asking one or more questions regarding the portion of the extracted one or more values that does not match the data.

11. The method of claim 9, wherein performing the chatbot conversation comprises:
requesting a user to provide spelling of a phrase;
receiving an audio signal from the user representing a user provided spelling of the phrase;
transcribing the audio signal to generate a text string;

extracting one or more alternate spellings of the phrase from the generated text string.

12. The method of claim 11, wherein extracting an alternate spelling of the phrase from the generated text string comprises:
   identifying an occurrence of a predefined separator in the text string;
   determining that a keyword immediately preceding the separator represents a letter;
   determining whether the letter matches a first letter of a keyword immediately following the separator;
   responsive to the letter matching the first letter of the keyword immediately following the separator, determining that the sub-phrase comprising the separator, the keyword immediately preceding the separator and the keyword immediately following the separator represent the letter.

13. The method of claim 9, wherein determining the measure of correctness of each sub-phrase of the phrase comprises:
   providing the phrase to a data source;
   receiving a partially matching phrase from the data source;
   comparing sub-phrases of the phrase with sub-phrases of the partially matching phrase; and
   determining correctness of each sub-phrase based on the comparison.

14. A computer program product comprising a non-transitory computer readable storage medium having instructions encoded thereon that, when executed by a processor, cause the processor to:
   receiving a request for authentication from a user;
   receiving an authentication plan comprising an expression based on phrase types, each phrase type associated with a phrase verification method;
   performing a chatbot conversation with the user based on the authentication plan, comprising, repeating until the expression is evaluated:
      selecting a phrase type from the authentication expression;
      asking one or more questions to the user based on the phrase verification method corresponding to the selected phrase type;
      receiving a phrase from the user in response to the one or more questions;
      extracting one or more values from the received phrase; and
      determining whether the expression can be evaluated; and
   authenticating the user according to a result of the evaluation of the authentication expression.

15. The computer program product of claim 14, wherein performing the chatbot conversation comprises using a data source to identify potential inaccuracies in the extracted one or more values by:
   comparing the extracted one or more values against data from a data source;
   determining that a portion of the extracted one or more values matches the data and that a portion of the extracted one or more values does not match the data; and
   asking one or more questions regarding the portion of the extracted one or more values that does not match the data.

16. The computer program product of claim 15, wherein the phrase type is a physical address and the data source is a mapping service that provides addresses similar to the phrase type.

17. The computer program product of claim 14, the processor further caused to:
   for each of a plurality of tenants, receiving a tenant-specific authentication plan comprising an expression based on phrase types, each phrase type associated with the phrase verification method.

18. The computer program product of claim 14, wherein determining a measure of correctness of each sub-phrase of the phrase comprises:
   providing the phrase to a data source;
   receiving a partially matching phrase from the data source;
   comparing sub-phrases of the phrase with sub-phrases of the partially matching phrase; and
   determining correctness of each sub-phrase based on the comparison.

* * * * *